US008588270B1

(12) United States Patent
Tucker (10) Patent No.: US 8,588,270 B1
(45) Date of Patent: Nov. 19, 2013

(54) ARCHITECTURE FOR ULTRA-WIDEBAND RADIO

(71) Applicant: University of South Florida, Tampa, FL (US)

(72) Inventor: James L. Tucker, Clearwater, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 13/693,652

(22) Filed: Dec. 4, 2012

Related U.S. Application Data

(62) Division of application No. 11/958,960, filed on Dec. 18, 2007, now Pat. No. 8,351,483.

(60) Provisional application No. 60/870,510, filed on Dec. 18, 2006.

(51) Int. Cl.
*H04B 1/00* (2006.01)

(52) U.S. Cl.
USPC ........... 375/130; 375/136; 375/138; 375/142; 375/134; 375/137; 375/143; 375/144; 375/145; 375/147; 375/149; 375/150; 375/152; 375/324; 375/325; 375/340; 375/343; 375/346; 327/31; 327/38; 327/48; 327/135; 327/131; 327/151; 327/152; 327/161; 327/160; 327/265; 342/83; 342/94; 342/100; 342/135; 342/137; 342/136; 342/145; 342/202

(58) Field of Classification Search
USPC ......... 375/130, 136, 138, 142, 134, 137, 143, 375/144, 145, 147, 149, 150, 152, 324, 325, 375/340, 343, 346; 342/83, 94, 100, 135, 342/137, 136, 145, 202; 327/31, 38, 48, 327/135, 131, 151, 152, 161, 160, 265
See application file for complete search history.

(56) References Cited

U.S. PATENT DOCUMENTS 5,677,927 A * 10/1997 Fullerton et al. .............. 375/130
5,687,169 A   11/1997 Fullerton
(Continued)

FOREIGN PATENT DOCUMENTS

EP    0823152 B1   7/2004
WO    9609694 A1   3/1996
(Continued)

OTHER PUBLICATIONS

Jeong Soo Lee and Cam Nguyen. "Novel Low-Cost Ultra-Wideband, Ultra-Short-Pulse Transmitter with MESFET Impulse-Shaping Circuitry for Reduced Distortion and Improved Pulse Repetition Rate." IEEE. 2001.

(Continued)

*Primary Examiner* — Daniel Washburn
*Assistant Examiner* — Rahel Guarino
(74) *Attorney, Agent, or Firm* — Nilay J. Choksi; Anton J. Hopen; Smith & Hopen, P.A.

(57) ABSTRACT

The invention includes a method for transmitting and detecting high speed Ultra Wideband pulses across a wireless interface. The transmitter includes a serializer and pulse generator. The receiver comprises a fixed delay line, multiplier, local serializer (with a sequence matching the transmitter), digital delay lines, low noise amplifier and logic fan-out buffer along with an array of D flip-flop pairs. Each flip-flop pair is enabled, at fixed time increments, to detect signals at a precise time; the timing is controlled by the pseudo-random sequence generated by the local serializer. A local tunable oscillator is controlled by detecting the phase change of the incoming signal and applying compensation to maintain the phase alignment and clock synchronization of the receiver to the clock reference of the transmitter. The invention uses a pair of pulses with a fixed delay and then relies on mixing the two to provide better noise immunity.

29 Claims, 8 Drawing Sheets

(56) References Cited

U.S. PATENT DOCUMENTS

| | | | |
|---|---|---|---|
| 5,757,320 | A | 5/1998 | McEwan |
| 5,805,110 | A | 9/1998 | McEwan |
| 5,960,031 | A | 9/1999 | Fullerton et al. |
| 5,995,534 | A | 11/1999 | Fullerton et al. |
| 6,031,862 | A | 2/2000 | Fullerton et al. |
| 6,142,059 | A | 11/2000 | Chan et al. |
| 6,239,741 | B1 | 5/2001 | Fontana et al. |
| 6,295,019 | B1 | 9/2001 | Richards et al. |
| 6,430,208 | B1 | 8/2002 | Fullerton et al. |
| 6,535,161 | B1 | 3/2003 | McEwan |
| 6,763,057 | B1 | 7/2004 | Fullerton et al. |
| 6,914,949 | B2 * | 7/2005 | Richards et al. ............. 375/346 |
| 2003/0043931 | A1 | 3/2003 | Fullerton et al. |
| 2003/0076136 | A1 | 4/2003 | McCorkle et al. |
| 2003/0108133 | A1 | 6/2003 | Richards |
| 2004/0157550 | A1 | 8/2004 | Nakagawa |

FOREIGN PATENT DOCUMENTS

| | | |
|---|---|---|
| WO | 9619737 A1 | 6/1996 |
| WO | 0143386 A1 | 6/2001 |
| WO | 0176086 A3 | 10/2001 |
| WO | 0244748 A3 | 6/2002 |

OTHER PUBLICATIONS

Fernando Ramirez-Mireles. "Performance of Ultrawideband SSMA Using Time Hopping and M-ary PPM." IEEE. Journal on Selected Areas in Communication. vol. 19. No. 6. Jun. 2001.

Moe Z. Win and Robert A. Scholtz. "Impulse Radio: How it Works." IEEE. Communication Letters. vol. 2. No. 2. Feb. 1998.

Andreas F. Molish, Yves-Paul Nakache, Philip Orlik, Jin Zhang, Yunnan Wu, Sinan Gezici, S.Y. Kung. "An Efficient Low-Cost Time Hopping Impulse Radio for High Data Rate Transmission." Mitsubishi Electric Research Laboratories. Cambridge, Massachusetts. Nov. 2003.

Jeongwoo Han and Cam Nguyen. "A New Ultra-Wideband, Ultra-Short Monocycle Pulse Generator with Reduced Ringing." IEEE. Microwave and Wireless Components Letters. vol. 12. No. 6. Jun. 2002.

Xiaomin Chen and Sayfe Kiaei. "Monocycle Shapes for Ultra Wideband Systems." IEEE. 2002.

Kevin Marsden, Hyung-Jin Lee, Dong Sam Ha and Hyung -S00 Lee. "Low Power CMOS Reprogrammable Pulse Generator for UWB Systems." Int. Conf. on Ultra Wideband Systems and Technologies. Reston, VA. pp. 443-447. Nov. 2003.

Glenn D. Weeks, J. Keith Townsend and James A. Freebersyser. "Performance of Hard Decision Detection for Impulse Radio." IEEE. 1999.

Won Namgoong. "A Channelized DSSS Ultra-Wideband Receiver." IEEE. 2001.

Giuseppe Durisi and Sergio Benedetto. "Comparison Between Coherent and Non-coherent Receivers for UWB Communications." Eurasip Journal on Applied Signal Processing, Oct. 1, 2003.

Antonio Petraglia and Sanjit K. Mitra. "High Speed A/D Conversion Using QMF Banks." IEEE. 1990.

D. Dickson and P. Jett. "An Application Specific Integrated Circuit Implementation of a Multiple Correlator for UWB Radio Applications." IEEE. 1999.

A. Azakkour, M. Regis, F. Pourchet and G. Alquie. "Challenges for a new integrated Ultra-wideband (UWB) source." Ultra Wideband Systems and Technologies, 2003 IEEE Conference on Nov. 16-19, 2003, pp. 433-437.

CDMA Design Staff, Spread Spectrum Series Part 1, Berkeley Varitronics System, Feb. 2001.

Spread Spectrum Series Part 2: Correlators. Berkeley Varitronics System, Mar. 2001.

B. Sheyer, Spread Spectrum Series Part 3: Delay Lock Loop in CDMA, Berkeley Varitronics System, Apr. 2001.

T. Buchegger and Gerald Obberger. "A Novel Low-Cost Ultra Wideband Microstrip Pulse Forming Network for Gaussian Monocycle Generation." Linz Center of Competence in Mechatronics. 26 pages, Jun. 2003.

J. Reed., R.M. Buehrer and D.S. Ha. "Introduction to UWB: Impulse Radio for Radar and Wireless Communications." Virginia Polytechnic Institute & State University Mobile & Portable Radio Research Group (MPRG). 55 pages, Jun. 2005.

"PulsON Technology Overview." Time Domain Corporation. Copyright Jul. 2001. 12 pages.

D. Bateman. "RF Aspects of Ultra-Wideband, Tutorial session IWUWBS Oulu." Motorola Labs CRM/BSTL. Motorola, 56 pages, Jun. 2003.

G.B. Giannakis. "Ultra Wideband Communications: An Idea whose Time has Come." Center of Excellence Wireless and Information Technology (CEWIT). Nov. 13, 2003. 35 pages.

Federal Communications Commission, First Report and Order: Revision of Part 15 of the Commission's Rules Regarding Ultra-Wideband Transmission Systems, Adopted Feb. 14, 2002; Released Apr. 22, 2002. 118 pages.

* cited by examiner

ARCHITECTURE FOR ULTRA-WIDEBAND RADIO

CROSS-REFERENCE TO RELATED APPLICATIONS

This nonprovisional application is a divisional of U.S. application Ser. No. 11/958,960, now U.S. Pat. No. 8,351,483, entitled "Architecture for Ultra-Wideband Radio", filed Dec. 18, 2007 by the same inventor, which is a continuation of and claims priority to provisional application No. 60/870,510, entitled "Architecture for Ultra Wide Band Radio", filed Dec. 18, 2006 by the same inventor.

BACKGROUND OF THE INVENTION

Ultra-wideband pulse technology has been at work for many years, but has traditionally used in classified applications. However, with the increasing number of wireless applications, UWB is seen as a technology that can provide additional bandwidth utilization without contributing to spectral crowding.

Ultra-wideband communication employs the technique of transmitting high frequency, very narrow-duration impulses referred to as monocycles through the radio channel. This provides a very large signal bandwidth from which the name arises. UWB radio does not require base band modulation. This characteristic makes this mechanism very desirable since, unlike other radio technologies, it is carrier less and thus provides the potential for reduced complexity and reduced cost. Although UWB promises to provide a viable, cost-effective, high-bandwidth, short-range radio communication channel solution there are considerable obstacles to overcome.

Figure 1:
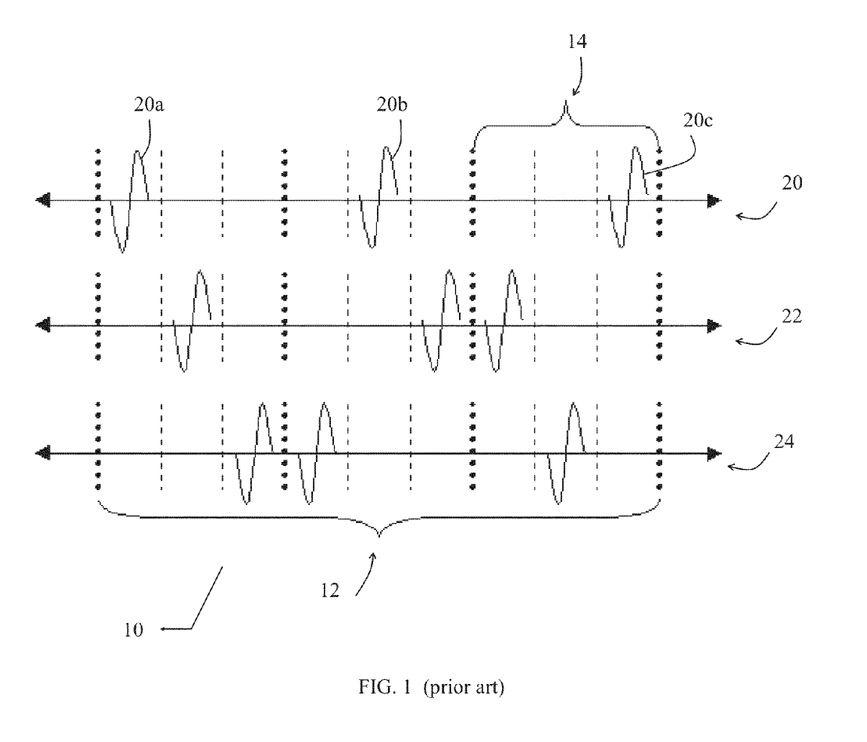
FIG. 1 is a graph showing multi-user transmission with time hopping access.

The example in FIG. 1 illustrates a multi-user transmission 10 where there are three users (20, 22, 24) each with a unique orthogonal time hopping code where each bit is represented by three pulses (i.e. 20a, 20b and 20c). A radio communicating with user 20 transmits three pulses (20a, 20b and 20c), having bit duration 12 and frame duration 14, for each bit sent in the time sequence designated to user 20. The receiver used by user 20 compares the received data against its designated time sequence until it finds a match then the receiver synchronizes to the received signal.

Figure 2:
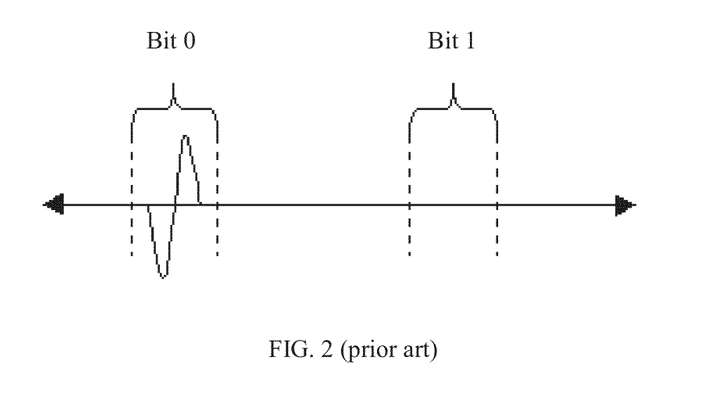
FIG. 2 is a graph showing on Off Keying (OOK).
Figure 3:
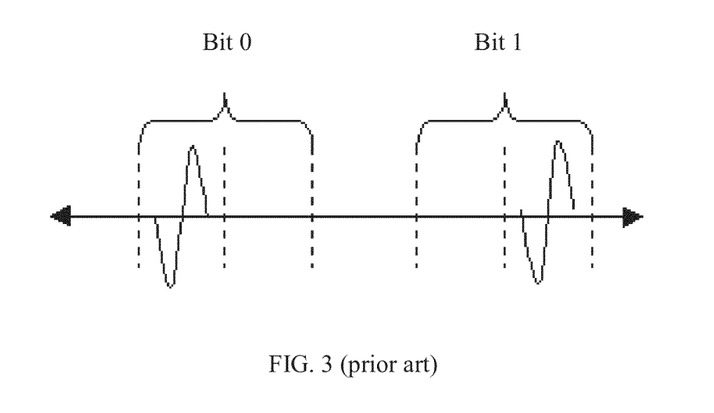
FIG. 3 is a graph showing pulse position modulation (PPM).

Once synchronized to the received channel the receiver must then decode the modulated data. This design supports On Off Keying (OOK) and Pulse Position Modulation (PPM). On Off Keying is where data pulses are switched on and off to modulate between 1 and 0 as shown in FIG. 2. For PPM the position of the monocycle is time shifted indicate a 1 or 0 as shown in FIG. 3.

As seen in the example above, impulse radio relies on a high precision timing sequence. The transmitter must broadcast pulses at precise time intervals constituting a specific time hopping sequence that repeats for each bit time. It is important to note that for a receiver to detect a broadcast it must generate its own local timing sequence that matches that of the transmitter. The receiver uses its local sequence to determine precisely the times that pulses are expected. The receiver then checks for pulses at each of these sequence times and then sum the total number of pulses detected over the length of the code sequence. This sum gives an indication of whether or not a bit is present.

SUMMARY OF INVENTION

The invention includes a method, and associated apparatus, for transmitting and detecting high-speed pseudo-random sequences and signal modulation across a wireless interface using Ultra Wideband pulses. The transmitter of the invention includes a serializer, pulse generator, amplifier and transmit antenna. The receiver comprises an antenna, fixed analog delay line, multiplier, local serializer with a sequence matching the receiver, digital delay lines, a low noise amplifier and logic fan-out buffer along with an array of D flip-flop pairs.

Each flip-flop pair is enabled, at fixed time increments, to only detect signals at a precise time; the timing is controlled by the pseudo-random sequence generated by the local serializer. This topology reduces the clock rate requirements of logic required to process the received signal. The invention utilizes a local tunable oscillator that is controlled by detecting the phase change of the incoming signal and applying compensation to maintain the phase alignment and clock synchronization of the receiver to the clock reference of the transmitter. The invention, therefore, utilizes a transmitted reference approach. The invention uses a pair of pulses with a fixed delay and then relies on mixing the two to provide better noise immunity.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Transmitter Architecture Overview

The transmitter timing sequence is used to directly stimulate a UWB pulse generator circuit. The radio utilizes a dual pulse transmitted reference transmission scheme. The transmitter emits ate least two pulses separated with a fixed time delay. Similar work exists on transmitting a single reference pulse for a series of pulses. The current invention, in contrast, emits at least two pulses every time.

Figure 4:
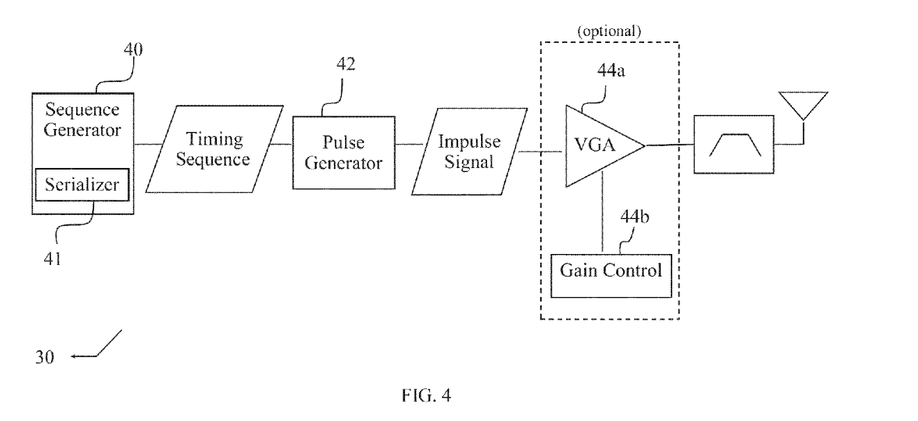
FIG. 4 is a block diagram of an illustrative transmitter topology.

FIG. 4 represents a block diagram of an illustrative transmitter topology for use with the current invention. The transmitter includes transmitter serializer (sequencer generator) 40, pulse generator 42, variable gain amplifier 44*a* and gain control 44*b*. In the example shown in FIG. 4, only on off keying and pulse position modulation are supported yet other embodiments are contemplated. All modulation functions are performed in the sequence generator (FPGA or ASIC). The variable gain amplifier/gain control is not functionally required but adds the flexibility of controlling the power output for various embodiments.

A high-speed sequence is preferred for optimal performance. The high-speed sequence is provided using a digital sequence generator and a high-speed serializer to multiplex the sequence rate into the gigahertz range.

Pulse Generator

There are currently many practical methods for generating RF impulses. These include various diodes (PIN, Schottky, varactor, and step recovery), avalanche transistors, and passive resonant circuits. The factors influencing the choice of implementation include cost, complexity, size, pulse repetition rate, and stability.

Figure 5:
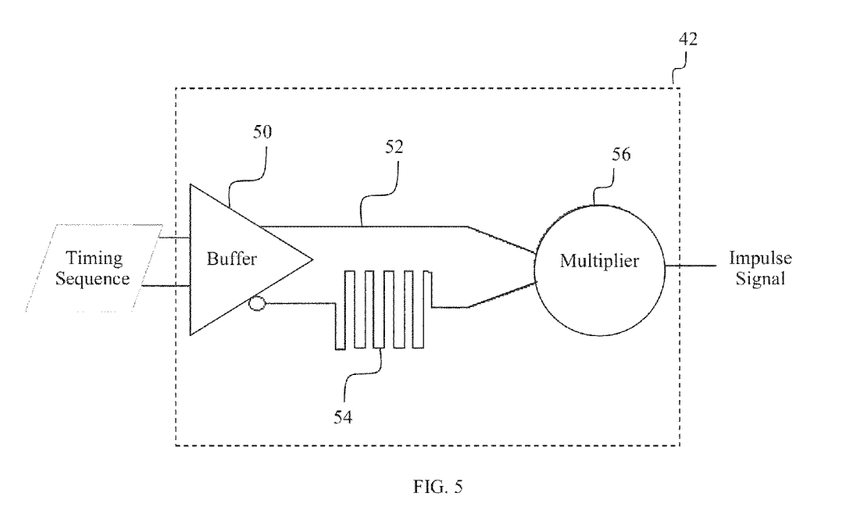
FIG. 5 is a block diagram of an illustrative pulse generator.

The circuit topology of a pulse generator for use in a preferred embodiment is shown in FIG. 5. The pulse generator includes PECL buffer 50, direct pulse line 52, delayed pulse line 54 and multiplier 56.

While other pulse generator approaches are contemplated, a preferred embodiment consists of a high-speed PECL buffer with a delay line and multiplier. PECL offers high speed with a high output voltage swing. The PECL buffer generates a differential pair that is typically routed differentially. In one embodiment, one of the signal outputs will be delayed by one pulse width then multiplied.

Figure 6:
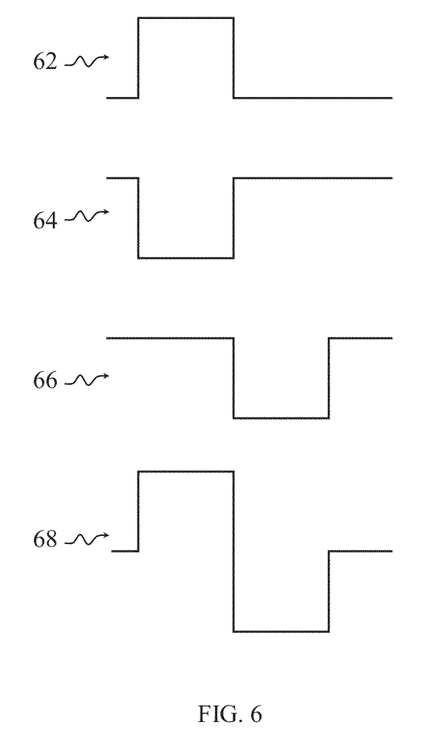
FIG. 6 is an illustration of pulse generator waveforms.
Figure 7:
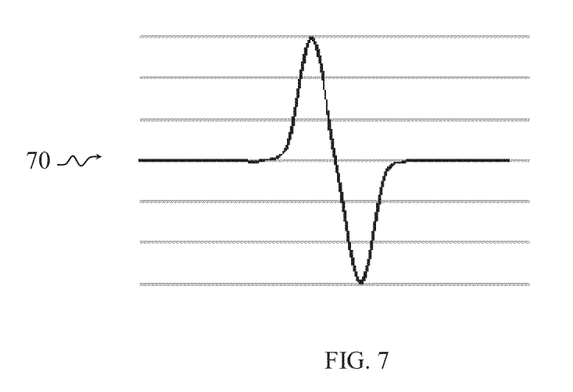
FIG. 7 depicts a monocycle after smoothing.

FIG. 6 represent illustrative waveforms (62-68) resulting from the pulse generator of the current invention, shown as ideal square waveforms. Waveform 68 is the result of a combination of waveform 62 and waveform 66. Inherent capacitance and inductance in actual layout provides filtering resulting in smoothing of the signal to provide a Gaussian monocycle shape (70) as shown in FIG. 7. Gain Control may be required to adjust transmit power.

Performance

The bit error rate (BER) in a UWB communication system that employs pulse position (PPM) modulation is given in equation 1, below:

$$P_b = Q\left(\sqrt{\frac{N_s E_{tx}}{2d^n \sigma^2}}\right) = Q\left(\sqrt{\frac{SNR}{2}}\right) \quad (1)$$

where $N_s$ is the number of pulses per symbol, $E_{tx}$ is the transmitted energy per pulse, d is the distance between the transmitter and receiver, n is the path loss exponent, $\sigma^2$ is the noise variance, and SNR denotes the signal-to-noise ratio. Table 1 provides an example performance calculation.

TABLE 1

| Bandwidth Calculation | |
|---|---|
| 0.4 ns | Time Resolution |
| 0.2 ns | Monocycle Period |
| 2 Integer | Pulse Duration (ns)/Time Resolution |
| 0.4 ns | Pulse Duration (ns) |

TABLE 1-continued

| | |
|---|---|
| 50% | Pulse Duty Cycle (time/width) |
| 9 | Sequence Length |
| 4 | Frame Size (pulses/frame) |
| 1 | Clocks per pulse duration |
| 14.4 | Bit (symbol) Time (ns) |
| 69.44 | Bandwidth (MHz) |
| Power Calculation | |
| 9 | Pulses per symbol (Ns) |
| 7500 MHz | Pulse Bandwidth (MHz) |
| 5.00E-03 bps | Bit Error Rate (# errored bits per second) |
| −41.3 dbm/Mhz | FCC Power Mask between 3.1-10.6 Mhz |
| 7.41E-05 mW/Mhz | FCC Power Mask between 3.1-10.6 Mhz |
| 0.556 mW/Mhz | FCC Max Energy Per Second |
| 0.625 J | Energy Per Pulse |
| 2 | pathloss exponent (n) |
| 1 | noise variance (sigma^2) |
| 13.52 | SNR |
| 0.64502 | distance (m) |

Receiver Architectural Overview

The receiver architecture implements a correlator receiver to detect UWB transmissions. The algorithm aims to take the sum of the energy received during each pulse time over the entire bit time sequence. The methodology described herein detects pulse events then sums the events digitally resulting in a simplified hardware interface.

Correlating receivers can be categorized as coherent or non-coherent receivers. For UWB the trade off between coherent and non-coherent is one driven by practical considerations. UWB relies on time hopping (TH) sequences for channelization. A coherent receiver allows the TH sequences to be generated serially providing the flexibility of changing timing sequences dynamically in software. The down side of the coherent receiver is that there is increased complexity and cost since the design requires a local oscillator to track the phase and frequency of the transmitter.

Non-coherent UWB receivers rely on a delay-based approach that requires the use of analog delay lines that are difficult to fabricate especially for long TH sequences. Delays in a non-coherent receiver should be long enough to match the time between consecutive pulses in a TH sequence. The non-coherent receiver is viable for short fixed TH sequences where the delay between consecutive pulses is within the capabilities of delay lines and may provide a more cost effective solution.

Coherent receivers need timing and channel estimation while non-coherent receivers have less stringent timing requirements and do not require channel estimation. A preferred embodiment employs both coherent and non-coherent components. The transmitted reference scheme can be put in the non-coherent category since it relies on a fixed delay and detects the signal based on the relative locations of pulses in the received signal. This reduces the complexity of the radio since channel estimation is not needed, however the coherent section of the design provides the flexibility of long software defined sequences.

Figure 8:
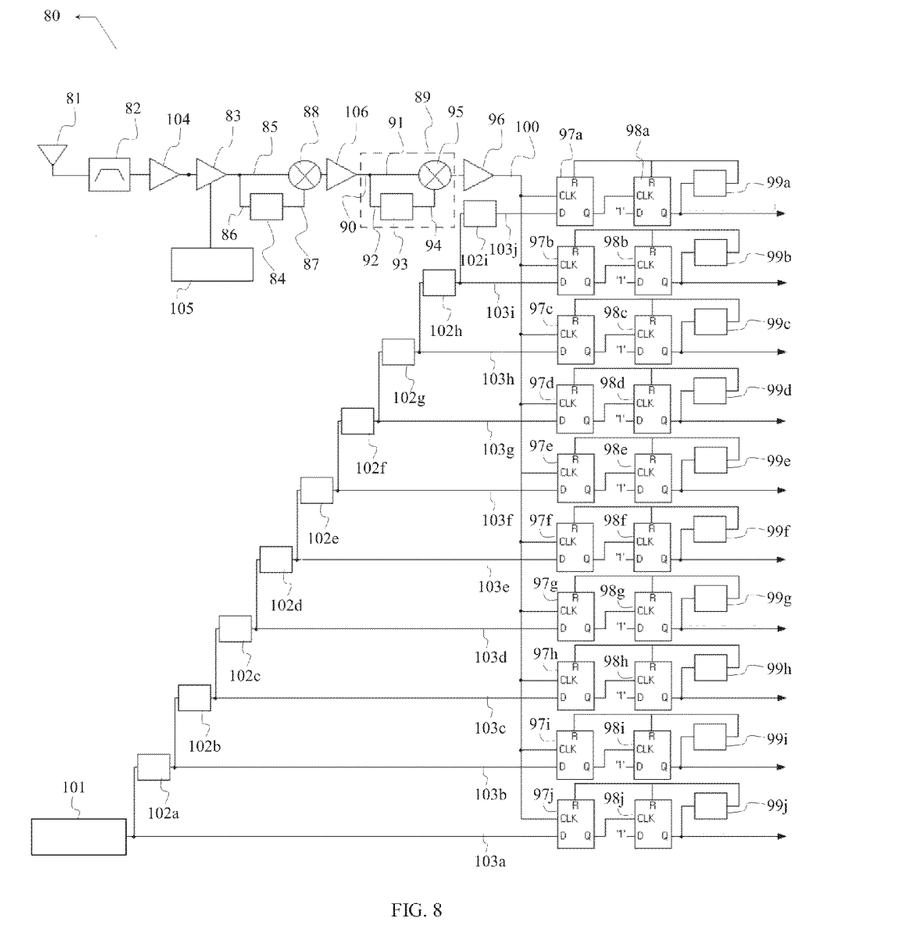
FIG. 8 is a block diagram showing and illustrative receiver topology utilizing an array of D-Flip Flip pairs.

This receiver design exploits the relatively small duty cycle and long frame duration of the time hopping sequence so that the data rate can be reduced by stretching representing detected pulses with a signal of a lower frequency resulting in lower signal processing costs. The output of the reduced data rate signals is used to increment counters that will be sampled then reset every bit time. A digital signal-processing algorithm uses the counts to track the number of pulses that occurred in each time division of the total sampled window. This information is used to determine the phase shift of the transmit clock for synchronization purposes as well as the data encoded by Pulse Position Modulation (PPM), or On Off Keying (OOK). The architecture described herein supports pulse position modulation where the pulse is shifted by an amount less than the sampling window. FIG. 8 shows the configuration used to detect UWB transmissions.

Functional Circuit

A block diagram of an embodiment of the receiver's UWB detection system 80 of the present invention is shown in FIG. 8. The first stage of receiver's UWB detection system 80 amplifies signal 81 received at antenna 82, using Low Noise Amplifier (LNA) 104 and Variable Gain Amplifier (VGA) 83 having gain control 105. After amplification, signal 81 is split into two signals, first signal 85 and second signal 86. Second signal 86 is delayed using fixed analog delay 84, which has a time delay that matches the time delay, t, between pulses sent by the transmitter. Multiplier 88 takes delayed signal 87 and first signal 85 as input and multiplies the two causing superposition of the two and resulting in a signal peak with relatively large amplitude. The signal is then amplified by second LGA 106. This transmitted reference approach simplifies receiver's UWB detection system 80 by eliminating the need for a local pulse mask generator and the high complexity of channel estimation.

Figure 9:
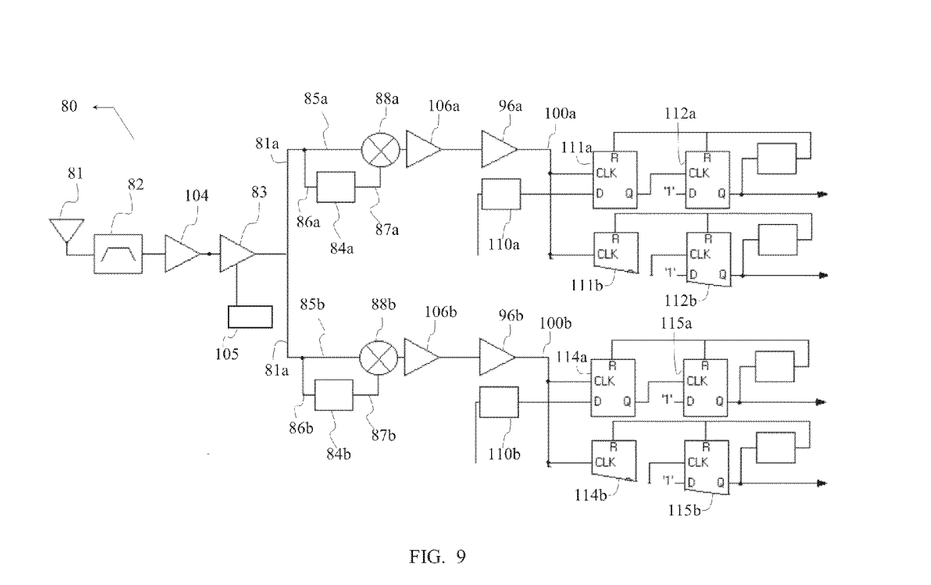
FIG. 9 is a block diagram of an alternate (relative to FIG. 8) receiver configuration.

An alternative embodiment of receiver's UWB detection system 80, shown in FIG. 9, allows two time delays to be used. Like the previous embodiment, signal 81 is received at antenna 82 and then amplified using LNA 104 and VGA 83, having gain control 105. However, after amplification signal 81 is duplicated into two signals, on signal 81a and off signal 81b.

On signal 81a, is again duplicated into two signals, first on signal 85a and second on signal 86a. Second on signal 86a is delayed using first delay 84a, which is used to indicate a one ('1') in the incoming signal. Multiplier 88a takes delayed on signal 87a and first on signal 85a as input and multiplies the two, causing superposition of the signals, resulting in a signal peak with relatively large amplitude. The signal is then amplified by second LGA 106a.

Off signal 81b is also again duplicated into two signals, first off signal 85b and second off signal 861. Second off signal 86b is delayed using second delay 84b, which is used to indicate a zero ('0') in the incoming signal. Multiplier 88b takes delayed off signal 87b and first off signal 85b as input and multiplies the two, causing superposition of the signals, resulting in a signal peak with relatively large amplitude. The signal is then amplified by second LGA 106b. This topology is preferable for PPM and can be supported with the transmitter architecture shown in FIG. 4. It also has the benefit of better power spectrum because the periodic repetition of using only a single delay is reduced.

The second stage, shown in FIG. 8, is an optional Narrow Band Interference (NBI) canceller 89, used to reduce the effects of a single expected narrow band interfering signal. This stage can be replicated to remove multiple interfering signals. NBI canceller (NBIC) 89 splits NBIC incoming signal 90 into two, first NBIC signal 91 and second NBIC signal 92. Second NBIC signal 92 is delayed by fixed analog delay 93 by half the period of the interfering signal, and then delayed signal 94 and first NBIC signal 91 are taken as input by multiplier 95. Multiplication of the two results in cancellation of the interfering signal. This may result in replicated pulse peaks; however, these are interpreted as multipath by receiver 80. NBI can cause problems with this architecture especially when the interfering signal is at a frequency higher than the pulse duration.

Amplification must be sufficient to provide a logic level output to high-speed buffer 96 (FIG. 9: 96a, 96b). Although one buffer is shown in FIG. 8, the practical implementation may require multiple buffers to fan out the signals to the multiple loads. The output of buffer 96 (FIG. 9: 96a, 96b) is taken as clock signal 100 (FIG. 9: 100a, 100b) by a first array of one or more D Flip-Flops (DFF) (i.e. 97a-97j; FIG. 9: i.e. 111a-111b, 114a-114b). The D-inputs of the first array of DFFs (i.e. 97a-97j; FIG. 9: i.e. 111a-111b, 114a-114b) propagate from the timing sequence signal 101 at various time delays. A second array of one or more DFFs (i.e. 98a-98j; FIG. 9: i.e. 112a-112b, 115a-115b) takes the Q-output of the first array of DFFs as its clock input. The D-input of the second array of DFFs are tied to a logic value of one ('1'). The output of the DFFs (i.e. 97a-97j FIG. 9: i.e. 111a-111b, 114a-114b) are updated with the logic level of the DFF input when clock signal 100 rises from a low state to a high state (rising edge) and the switching threshold of the DFFs (i.e. 97a-97j; FIG. 9: i.e. 111a-111b, 114a-114b) are exceeded. The peaks of clock signal 100 can be used to switch the clock input of high-speed flip-flops such that high frequency events can be captured and a pulse, having a longer duration, can be generated when a peak occurs within the sample window.

The output of the flip-flop stage is provided at a fraction of the rate of the incoming signal. Each output will toggle if a transition is detected during a valid time sequence. The signal can then be fed to a lower frequency device, such as an FPGA, to count the number of transitions during a bit time. The highest clock rates seen by this counter will be in the range of two times the frame frequency, and most of the the counter's processing will occur at rates below the rate of a bit time. This allows for the use of a smaller counter and time-sharing of resources, resulting in more efficient use of logic and power.

To be able to track events that occur at specific time instances, the above edge detection method should be replicated and cascaded in time by applying time delays such that the time window (set by the timing sequence 101 pulse width) for each edge detector overlaps the previous by at least half the period of the time window. This is preferred because the PCB layout will have variations in components and delays. Overlap will help to ensure that the design is robust to variation. In addition, if some gates latch up due to meta-stability, the results from adjacent gates can be used, providing redundancy and fault tolerance. An array of one or more delays (i.e. 102a-102i; FIG. 9: i.e. 110a, 110b) are implemented by replicating the timing sequence 101 generated by the receiver into n (10 for the illustration shown in FIG. 8 and discussed here) consecutive signals (i.e., 103a-103j) and delaying each consecutive signal (i.e. 103b-103j) with respect to the previous time. First consecutive timing signal 103a continues from original time signal sequence 101 without delay. Each remaining consecutive timing signal (i.e. 103b-103j) is delayed by less than half of timing sequence 101 pulse duration. These consecutive timing signals (i.e. 103a-103j) will each represent a specific time position and be used as D-inputs to DFFs of the first array of DFFs (i.e. 97a-97j). The n logic gates are each enabled at different times such that each enable time overlaps with the next consecutive time by a fraction $$\left(\frac{a}{b}\right)$$

of the sequence time period ($T_s$) so that n logic gates cover a total time (t) of $$t = T_s\left(\frac{b-a}{b}\right)n$$

If a transition occurs on the clock input of a DFF in the first array of DFFs (i.e. 97a-97j) white the timing sequence is valid then the output will transition high causing le output of the corresponding DFF of the second array of DFFs (i.e. 98a-98j) to transition high and remain high until both DFFs are reset after time $T_d$. The delay $T_d$, provided by an array of one or more fixed analog delays (i.e., 99a-99j), ensures that the frequency (F) of the signal is now less than $$F = \frac{1}{T_d}$$

Now this low frequency signal can be used to increment low speed counters. Accordingly, each logic gate only requires one signal for single ended or two signals for differential signaling. This results in reduced hardware I/O requirements.

Synchronization

The process of matching the clock reference of the receiver to that of the transmitter is referred to as synchronization. Both transmitter and receiver interfaces will have separate clock reference sources each with frequency stability to within +/−100 ppm of each other. Oscillators with tighter clock stability may be used to improve acquisition times.

Synchronization, in a preferred embodiment, is attained and maintained as follows. For communication, the transmitter of the transmitting radio is configured with the same time hopping code as the receiver of the receiving radio. Since both clock sources are initially unsynchronized there will be a frequency offset between the transmitter and receiver such that the codes for each will gradually changed phase with each other until eventually they will both temporarily align (if phase change continues the signals would shift out of alignment).

Figure 10:
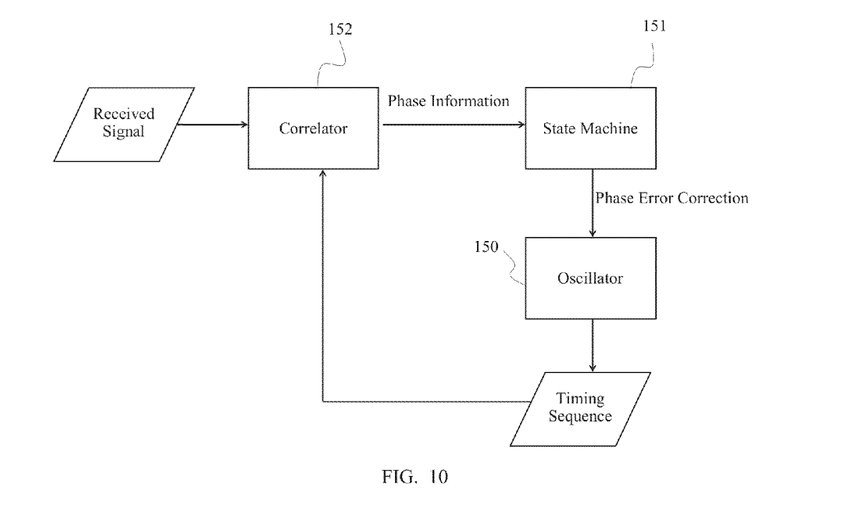
FIG. 10 is a top-level block diagram of clock synchronization.

Since the architecture provides an array of n time steps, the algorithm will track the phase change once temporary alignment is attained and then adjust the local reference frequency to minimize phase change. The top-level block diagram of the synchronization approach is shown in FIG. 10. The local reference frequency is continuously adjusted during normal operation so that its' average frequency is equal to the transmitter's frequency. For frequency adjustment, a numerically controlled oscillator or voltage-controlled oscillator generates the receivers' clock reference and is under the FPGAs direct control. A state machine controls acquisition and synchronization. The algorithm maintains synchronization by keeping the first received pulse centered within the whole time window.

A state machine controls the signal acquisition and clock recovery in the system. The machine controls the process for signal acquisition. The first state of the machine seeks to find a valid signal output from the correlator with the local clock at an offset this will be the course synchronization. Once valid signals have been detected marked by the counts representing a step-like distribution across the n-counters, the state machine begins to compensate for the frequency offset between the transmitter and receiver. The direction of clock adjustment is based on the direction of movement of step distribution.

Figure 11:
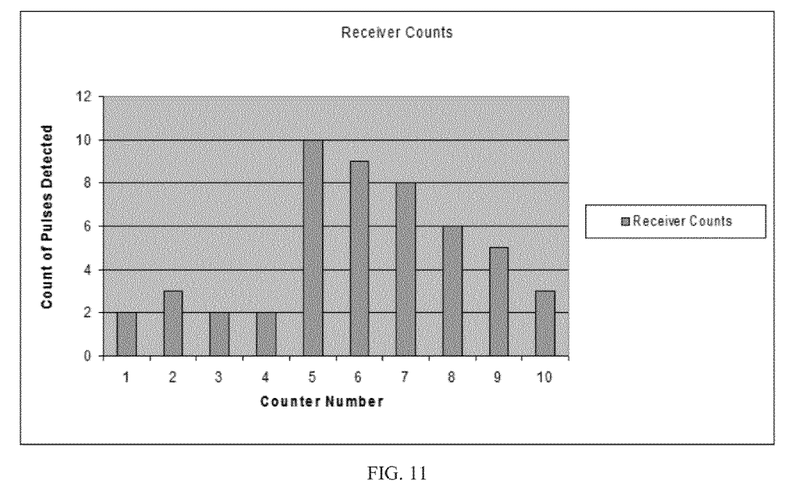
FIG. 11 is a graph of an example initial distribution of counter inputs.
Figure 12:
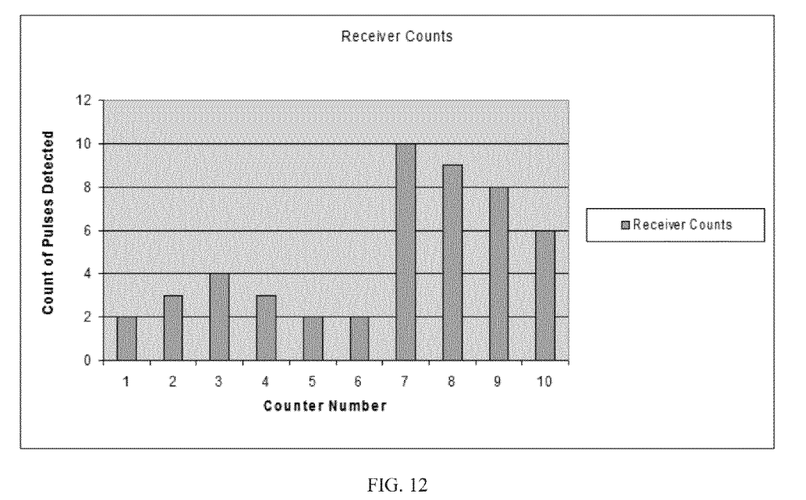
FIG. 12 is a graph of an example subsequent distribution of counter inputs (TX frequency higher).
Figure 13:
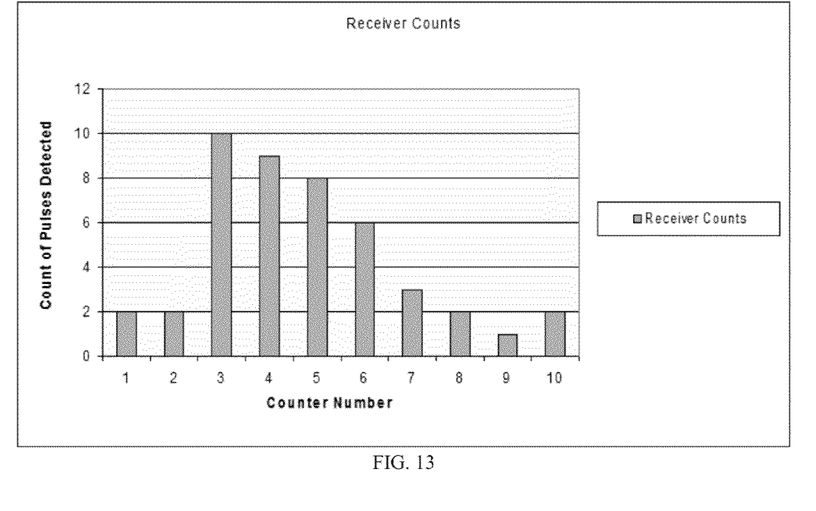
FIG. 13 is a graph of an example subsequent distribution of counter inputs (TX frequency lower).

The distribution of count values indicating the presence of a detected pn sequence as related to frequency offset are illustrated in FIGS. 11-13. The first distribution (FIG. 11) shows the detection position of sequence at a time when the pn sequence has been detected and is being tracked. The number of the count increases with time that the data was sampled. For example, counter 1 receives data earliest in time. The second (FIG. 12) and third (FIG. 13) distributions show the possible distributions several bit times later. In FIG. 12, the position of the detected sequence moved to the left of its initial location, indicating that the transmitter clock is at a higher frequency than the local clock reference. In this case, the synchronization circuit would increase the frequency of the local clock reference to compensate for the detected offset. In FIG. 13, the position of the detected sequence moved to the right of the location where it was initially detected, indicating the transmitter clock is at a lower frequency than the local clock reference. In this case, the local reference clock frequency would be reduced. The action of clock adjustments is required continuously during operation of the radio, since the exact transmitter frequency is never attained. What is accomplished is an average clock frequency that matches that of the transmitter. This adjustment also keeps the detected clock sequence centered in the time window covered by the sequence detector. If the sequence is lost then the detection process restarts from the beginning.

Figure 14:
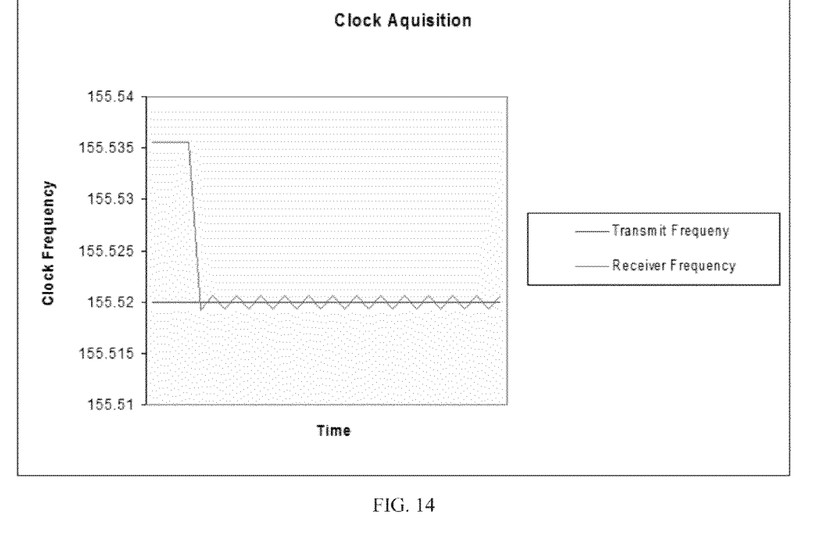
FIG. 14 is a graph of clock acquisition.

FIG. 14 gives an example of the expected behavior of the receiver frequency during clock acquisition with time. In the example the local transmit reference starts at +100 ppm off from the center frequency of the transmit clock. Once the sequence is detected the receiver makes an initial course adjustment, then monitors the change in frequency then adjusts until phase change is minimal at this point it will begin the fine synchronization adjustments. During fine adjustments the receiver frequency will average out to match the transmit frequency resulting in synchronization.

VCO or NCO Operation

A voltage controlled oscillator (VCO) or numerically controlled oscillator (NCO) can be used for generating the local clock reference. The VCO requires only a single voltage input to control the offset of the clock frequency while the NCO requires a digital word.

Signal Processing

The digital signal processing requirements of this design are simplified since the input to the algorithm is reduced to an array of n count variables where each variable represents the count of transitions that occurred during one-bit time at each of the n time positions at each of the n flip flops. One-bit time is the amount of time that it takes for the sequence to repeat. The receiver's serializer is synchronized with the counter such that the total count for each bit period is captured and stored so that processing can be performed at a lower rate. The selection of appropriate data encoding methods, such as interleaving and error detection and correction codes, will be apparent to one of skill in the art given the demands of a particular embodiment as dictated by its intended use.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method for receiving and processing a radio signal in a transmitter-receiver environment, comprising:
    receiving the radio signal having at least two pulses and a fixed time between the at least two pulses;
    generating a larger-amplitude signal with an amplitude greater than an amplitude of the received radio signal;
    replicating the larger-amplitude signal to generate at least two duplicate signals;
    generating a timing sequence;
    replicating the timing sequence into a plurality of timing sequences each delayed in time; and
    outputting at least a first counter value responsive to a value of one of the plurality of timing sequences being valid when the value of at least one of the at least two duplicate signals transitions.

2. The method of claim 1, further comprising amplifying the received radio signal.

3. The method of claim 1, wherein generating the larger-amplitude signal with an amplitude greater than an amplitude of the received signal includes:
    delaying the received radio signal by the fixed time between the at least two pulses; and
    combining the delayed radio signal and the received radio signal.

4. The method of claim 3, wherein combining the delayed radio signal and the received radio signal includes multiplying the delayed radio signal and the received radio signal, summing the delayed radio signal and the received radio signal, and superpositioning the delayed radio signal and the received radio signal.

5. The method of claim 1, further comprising amplifying the larger-amplitude signal.

6. The method of claim 1, further comprising removing an interfering signal, having a known period, from the larger-amplitude signal.

7. The method of claim 6, wherein removing the interfering signal, having a known period, from the larger-amplitude signal includes:
    delaying the larger-amplitude signal by the period of the interfering signal; and
    multiplying the delayed larger-amplitude signal and the interfering signal.

8. The method of claim 1, wherein the plurality of timing sequences are consecutive timing sequences delayed in time by less than half of the fixed time between the at least two pulses of the original timing sequence.

9. The method of claim 1, further comprising:
    summing the value of the first counter value over a first period of time;
    summing the value of at least a second counter value over the first period of time;
    tracking the number of pulses that occur over a second period of time using at least the sum of the value of the first counter value and the sum of the value of the second counter value; and
    adjusting the phase of the timing sequence using the number of pulses.

10. The method of claim 1, further comprising:
    generating a pseudo-random sequence with a time hopping code matching that of a transmitter;
    detecting the pulses at a plurality of times dictated by the pseudo-random sequence;
    summing the pulses at a plurality of time periods during the times dictated by the pseudo-random sequence; and
    determining a phase shift of an incoming signal over a bit time.

11. The method of claim 10, further comprising synchronizing the clock of a receiver with the received radio signal using the phase shift of the incoming signal.

12. The method of claim 10, further comprising demodulating the data in the received radio signal using the phase shift of the incoming signal.

13. A receiver, comprising:
    a receiving stage that receives a radio signal having at least two pulses and a fixed time between the at least two pulses;
    a signal modification stage that generates a signal having an amplitude larger than an amplitude of the received radio signal;
    a fan-out stage that replicates the larger-amplitude signal and generates at least two duplicate signals based at least in part on the replicated larger-amplitude signal;
    a sequence generator stage that serially generates a timing sequence;
    at least one sequence delay stage that replicates the timing sequence into a plurality of timing sequences each delayed in time; and
    at least one counter control stage that outputs a counter value responsive to a pulse of one of the duplicate larger-amplitude signals and one of the plurality of timing sequences.

14. The receiver of claim 13, further comprising an amplifier stage that amplifies the received radio signal.

15. The receiver of claim 14, wherein the amplifier stage includes at least one of a low-noise amplifier or a variable-gain amplifier.

16. The receiver of claim 13, wherein the signal modification stage includes:
    at least one signal delay stage that delays the received radio signal by the fixed time between the at least two pulses; and
    at least one combination stage that combines the delayed radio signal and the received radio signal.

17. The receiver of claim 16, wherein the at least one combination stage includes a multiplier that multiplies the delayed radio signal and the received radio signal.

18. The receiver of claim 16, wherein the at least one combination stage includes a summer that sums the delayed radio signal.

19. The receiver of claim 13, further comprising an amplification stage that amplifies the larger-amplitude signal.

20. The receiver of claim 13, further comprising at least one removal stage that removes at least one narrow-band interferer, having a known period.

21. The receiver of claim 20, wherein the at least one removal stage includes:
    at least one delay stage that delays the larger-amplitude signal by the period of an expected interfering signal; and
    at least one multiplier that multiplies the delayed larger-amplitude signal and the expected interfering signal.

22. The receiver of claim 13, wherein the fan-out stage includes at least one buffer.

23. The receiver of claim 13, wherein the sequence generator stage includes a serializer.

24. The receiver of claim 13, wherein the plurality of timing sequences are consecutive timing sequences delayed in time by less than half of the fixed time between the at least two pulses of the original timing sequence.

25. The receiver of claim 13, wherein the counter value increments a counter.

26. The receiver of claim 13, wherein the counter value is responsive to a rising edge of the pulse of the duplicate larger-amplitude signal.

27. The receiver of claim 26, wherein the value of the timing sequence is output on the rising edge of the pulse of the duplicate larger-amplitude signal.

28. The receiver of claim 13, wherein the counter value is reset after a predetermined delay time.

29. The receiver of claim 13, wherein the counter control stage includes:
- a first D flip-flop with an input connected to the timing sequence and a clock connected to the pulse of the duplicate larger-amplitude signal that outputs the value of the timing sequence based on the pulse of the duplicate larger-amplitude signal; and
- a second D flip-flop with an input set to a predetermined value and a clock connected to the output of the first D flip-flop that outputs the predetermined value when the clock is enabled by the timing sequence.

* * * * *